(12) United States Patent
Uchino et al.

(10) Patent No.: US 9,749,848 B2
(45) Date of Patent: Aug. 29, 2017

(54) USER APPARATUS, BASE STATION, USER APPARATUS CATEGORY INFORMATION NOTIFICATION METHOD, AND USER APPARATUS CATEGORY INFORMATION RECEPTION METHOD

(71) Applicant: NTT DOCOMO, INC., Tokyo (JP)

(72) Inventors: Tooru Uchino, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/890,602

(22) PCT Filed: May 27, 2014

(86) PCT No.: PCT/JP2014/063982
§ 371 (c)(1),
(2) Date: Nov. 12, 2015

(87) PCT Pub. No.: WO2014/192748
PCT Pub. Date: Dec. 4, 2014

(65) Prior Publication Data
US 2016/0119778 A1    Apr. 28, 2016

(30) Foreign Application Priority Data
May 31, 2013    (JP) .................................. 2013-116426

(51) Int. Cl.
*H04W 4/00*      (2009.01)
*H04W 8/24*      (2009.01)
(Continued)

(52) U.S. Cl.
CPC ............. *H04W 8/24* (2013.01); *H04L 5/0053* (2013.01); *H04L 5/0023* (2013.01); *H04W 28/22* (2013.01); *H04W 84/042* (2013.01)

(58) Field of Classification Search
CPC ....... H04W 48/12; H04W 28/22; H04W 8/24; H04W 84/042; H04L 5/0023; H04L 5/0053
(Continued)

(56) References Cited

U.S. PATENT DOCUMENTS

| | | | |
|---|---|---|---|
| 2009/0213806 A1* | 8/2009 | Ode | H04W 8/22 370/329 |
| 2010/0008309 A1* | 1/2010 | Cheng | H04W 72/04 370/329 |

(Continued)

FOREIGN PATENT DOCUMENTS

| | | |
|---|---|---|
| WO | 2012/141634 A1 | 10/2012 |
| WO | 2013/077554 A1 | 5/2013 |

OTHER PUBLICATIONS

Extended European Search Report in counterpart European Application No. 14 80 3721.1 issued Jun. 6, 2016 (9 pages).
(Continued)

*Primary Examiner* — Timothy Pham
(74) *Attorney, Agent, or Firm* — Osha Liang LLP

(57) ABSTRACT

A user apparatus in a mobile communication system including a base station and a user apparatus, including: a support status determination unit configured to receive, from the base station, support status information indicating whether the base station supports a predetermine notification method on category information of the user apparatus, and to determine whether the base station supports the predetermined notification method based on the support status information; and a category information notification control unit configured, when the support status determination unit determines that the base station supports the predetermined notification method, to notify the base station of a combination of first category information and second category information so as to notify the base station of category information of the user apparatus.

6 Claims, 18 Drawing Sheets

(51) Int. Cl.
*H04W 28/22* (2009.01)
*H04L 5/00* (2006.01)
*H04W 84/04* (2009.01)

(58) Field of Classification Search
USPC .................................................. 455/422.1
See application file for complete search history.

(56) References Cited

U.S. PATENT DOCUMENTS

2010/0135208 A1* 6/2010 Ishii ...................... H04W 76/02
370/328
2011/0319069 A1* 12/2011 Li ........................... H04W 8/22
455/422.1
2013/0028304 A1* 1/2013 Murata .................. H04W 48/12
375/219
2013/0142125 A1* 6/2013 Shimezawa ............ H04B 7/046
370/328
2014/0204848 A1* 7/2014 Geirhofer .............. H04B 7/024
370/329
2014/0328228 A1 11/2014 Park et al.

OTHER PUBLICATIONS

International Search Report issued in corresponding application No. PCT/JP2014/063982 mailed Aug. 5, 2014 (1 page).
Written Opinion issued in corresponding application No. PCT/JP2014/063982 mailed Aug. 5, 2014 (3 pages).
3GPP TS 36.306 V10.9.0; "4.1 ue-Category"; pp. 9-10; Mar. 2013 (2 pages).
3GPP TS 36.331 V10.9.0; "6.3.6 Other information elements UE-EUTRA-Capability"; pp. 237-246; Mar. 2013 (10 pages).

* cited by examiner

FIG.1

| UE Category | Maximum number of DL-SCH transport block bits received within a TTI (Note) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |

NOTE: In carrier aggregation operation, the DL-SCH processing capability can be shared by the UE with that of MCH received from a serving cell. If the total eNB scheduling for DL-SCH and an MCH in one serving cell at a given TTI is larger than the defined processing capability, the prioritization between DL-SCH and MCH is left up to UE implementation.

FIG.2

```
UE-EUTRA-Capability information element

UE-EUTRA-Capability ::=SEQUENCE {
    accessStratumRelease                AccessStratumRelease,
    ue-Category    INTEGER (1..5),
    ....,
    nonCriticalExtension     UE-EUTRA-Capability-v920-IEs    OPTIONAL
}

UE-EUTRA-Capability-v920-IEs ::= SEQUENCE {
    ....
    nonCriticalExtension     UE-EUTRA-Capability-v940-IEs    OPTIONAL
}

UE-EUTRA-Capability-v940-IEs ::= SEQUENCE {
    ....
    nonCriticalExtension     UE-EUTRA-Capability-v1020-IEs   OPTIONAL
}

UE-EUTRA-Capability-v1020-IEs ::=  SEQUENCE {
    ue-Category-v1020        INTEGER (6..8)                  OPTIONAL,
    nonCriticalExtension     UE-EUTRA-Capability-v1060-IEs   OPTIONAL
}

UE-EUTRA-Capability-v1060-IEs ::= SEQUENCE {
    ....
    nonCriticalExtension     SEQUENCE {}                     OPTIONAL
}
```

FIG.5

```
-- ASN1START

SystemInformationBlockType2 ::=         SEQUENCE {
    ac-BarringInfo                          SEQUENCE {
        ac-BarringForEmergency                  BOOLEAN,
        ac-BarringForMO-Signalling              AC-BarringConfig    OPTIONAL,
-- Need OP
        ac-BarringForMO-Data                    AC-BarringConfig    OPTIONAL
-- Need OP

. . . . . . . . . .
                                        . . . . . . . . . .

lateNonCriticalExtension            OCTET STRING (CONTAINING
SystemInformationBlockType2-v8h0-IEs)                               OPTIONAL,   -- Need OP
    [[      ssac-BarringForMMTEL-Voice-r9      AC-BarringConfig    OPTIONAL,
-- Need OP
            ssac-BarringForMMTEL-Video-r9      AC-BarringConfig    OPTIONAL
-- Need OP
    ]],
    [[      ac-BarringForCSFB-r10              AC-BarringConfig    OPTIONAL
-- Need OP
    ]]
}

SystemInformationBlockType2-v8h0-IEs ::=    SEQUENCE {
    multiBandInfoList                       SEQUENCE (SIZE (1..maxMultiBands)) OF
AdditionalSpectrumEmission  OPTIONAL,   -- Need OR
    nonCriticalExtension                    SystemInformationBlockType2-v11xy-IEs
    OPTIONAL    -- Need OP
}
SystemInformationBlockType2-v11xy-IEs ::= SEQUENCE {
    eNBRelIndicator-r11         BOOLEAN                 OPTIONAL,   -- Need OR
    nonCriticalExtension        SEQUENCE {}             OPTIONAL    -- Need OP
}
AC-BarringConfig ::=                    SEQUENCE {
    ac-BarringFactor                        ENUMERATED {
                                                p00, p05, p10, p15, p20, p25, p30, p40,
                                                p50, p60, p70, p75, p80, p85, p90, p95},
    ac-BarringTime                          ENUMERATED {s4, s8, s16, s32, s64, s128, s256, s512},
    ac-BarringForSpecialAC                  BIT STRING (SIZE(5))
}
                                        . . . . . . . . . .
                                        . . . . . . . . . .
```

```
...
    lateNonCriticalExtension            OCTET STRING (CONTAINING
SystemInformationBlockType2-v8h0-IEs)                              OPTIONAL,    -- Need OP
    [[  ssac-BarringForMMTEL-Voice-r9              AC-BarringConfig  OPTIONAL,
        -- Need OP
        ssac-BarringForMMTEL-Video-r9              AC-BarringConfig  OPTIONAL
        -- Need OP
    ]],
    [[  ac-BarringForCSFB-r10                      AC-BarringConfig  OPTIONAL
        -- Need OP
    ]]
}

SystemInformationBlockType2-v8h0-IEs ::= SEQUENCE {
    multiBandInfoList                   SEQUENCE (SIZE (1..maxMultiBands)) OF
AdditionalSpectrumEmission             OPTIONAL,        -- Need OR
    nonCriticalExtension                SystemInformationBlockType2-v11xy-IEs
    OPTIONAL                            -- Need OP
}
SystemInformationBlockType2-v11xy-IEs ::= SEQUENCE {
    eNBReIIndicator-r11                 ENUMERATED [Rel-11,Rel-12,Re-13]
    OPTIONAL                            -- Need OR
    nonCriticalExtension                SEQUENCE {}       OPTIONAL    -- Need OP
}

AC-BarringConfig ::=                    SEQUENCE {
    ac-BarringFactor                    ENUMERATED {
                                            p00, p05, p10, p15, p20, p25, p30, p40,
                                            p50, p60, p70, p75, p80, p85, p90, p95},
    ac-BarringTime                      ENUMERATED {s4, s8, s16, s32, s64, s128, s256, s512},
    ac-BarringForSpecialAC              BIT STRING (SIZE(5))
}
```

FIG.6

```
-- ASN1START

UECapabilityEnquiry ::=          SEQUENCE {
    rrc-TransactionIdentifier    RRC-TransactionIdentifier,
    criticalExtensions           CHOICE {
        c1                       CHOICE {
            ueCapabilityEnquiry-r8    UECapabilityEnquiry-r8-IEs,
            spare3 NULL, spare2 NULL, spare1 NULL
        },
        criticalExtensionsFuture     SEQUENCE {}
    }
}

UECapabilityEnquiry-r8-IEs ::= SEQUENCE {
    ue-CapabilityRequest         UE-CapabilityRequest,
    nonCriticalExtension         UECapabilityEnquiry-v8a0-IEs             OPTIONAL
}

UECapabilityEnquiry-v8a0-IEs ::= SEQUENCE {
    lateNonCriticalExtension     OCTET STRING
-- Need OP
    nonCriticalExtension         UECapabilityEnquiry-v12xy-IEs
}
UECapabilityEnquiry-v12xy-IEs ::= SEQUENCE {
    eNBRelIndicator-r11  BOOLEAN                                          OPTIONAL,    -- Need OR
    nonCriticalExtension         SEQUENCE {}                              OPTIONAL
}

UE-CapabilityRequest ::=         SEQUENCE (SIZE (1..maxRAT-Capabilities)) OF RAT-Type

-- ASN1STOP
```

FIG.7

```
-- ASN1START

UECapabilityEnquiry ::=          SEQUENCE {
    rrc-TransactionIdentifier    RRC-TransactionIdentifier,
    criticalExtensions           CHOICE {
        c1                           CHOICE {
            ueCapabilityEnquiry-r8       UECapabilityEnquiry-r8-IEs,
            spare3 NULL, spare2 NULL, spare1 NULL
        },
        criticalExtensionsFuture     SEQUENCE {}
    }
}

UECapabilityEnquiry-r8-IEs ::=   SEQUENCE {
    ue-CapabilityRequest         UE-CapabilityRequest,
    nonCriticalExtension         UECapabilityEnquiry-v8a0-IEs            OPTIONAL
}

UECapabilityEnquiry-v8a0-IEs ::= SEQUENCE {
    lateNonCriticalExtension     OCTET STRING                            OPTIONAL,
    -- Need OP
    nonCriticalExtension         UECapabilityEnquiry-v12xy-IEs
}

UECapabilityEnquiry-v12xy-IEs ::= SEQUENCE {
    eNBRelIndicator-r11          ENUMERATED {Rel-11,Rel-12,Re-13}        OPTIONAL,    -- Need OR
    nonCriticalExtension         SEQUENCE {}                             OPTIONAL
}

UE-CapabilityRequest ::=         SEQUENCE (SIZE (1..maxRAT-Capabilities)) OF RAT-Type

-- ASN1STOP
```

| | 6 | 7 | 8 | |
|---|---|---|---|---|
| 1 | Cat9 | Cat10 | Cat11 | |
| 2 | Cat12 | Cat13 | Cat14 | |
| 3 | Cat15 | Cat16 | Cat17 | |
| 4 | USED IN Rel-10 | USED IN Rel-10 | Cat18 | |
| 5 | Cat19 | Cat20 | USED IN Rel-10 | |

NOTIFY BY Rel-8 UE cat field

NOTIFY BY Rel-10 UE cat field

FIG.14

SUPPORTED BANDWIDTH

| Rel-8 UE cat | 50M | 60M | 70M |
|---|---|---|---|
| 1 | Cat9 | Cat··· | |
| 2 | Cat10 | | |
| 3 | Cat11 | | |
| 4 | Cat12 | | |
| 5 | Cat13 | | |

```
UE-EUTRA-Capability-v1060-IEs ::=    SEQUENCE {
    .....
    rf-Parameters-v1060              RF-Parameters-v1060         OPTIONAL,
    nonCriticalExtension             SEQUENCE {}                 OPTIONAL
}

RF-Parameters-v1060 ::=              SEQUENCE {
    supportedBandCombinationExt-r10  SupportedBandCombinationExt-r10
}

SupportedBandCombination-r10 ::= SEQUENCE (SIZE (1..maxBandComb-r10)) OF BandCombinationParameters-r10

BandCombinationParameters-r10 ::= SEQUENCE (SIZE (1..maxSimultaneousBands-r10)) OF BandParameters-r10

BandParameters-r10 ::= SEQUENCE {
    bandEUTRA-r10                    INTEGER (1..64),
    bandParametersUL-r10             BandParametersUL-r10        OPTIONAL,
    bandParametersDL-r10             BandParametersDL-r10        OPTIONAL
}

BandParametersUL-r10 ::= SEQUENCE (SIZE (1..maxBandwidthClass-r10)) OF CA-MIMO-ParametersUL-r10

CA-MIMO-ParametersUL-r10 ::= SEQUENCE {
    ca-BandwidthClassUL-r10          CA-BandwidthClass-r10,
    supportedMIMO-CapabilityUL-r10   MIMO-CapabilityUL-r10       OPTIONAL
}

BandParametersDL-r10 ::= SEQUENCE (SIZE (1..maxBandwidthClass-r10)) OF CA-MIMO-ParametersDL-r10

CA-MIMO-ParametersDL-r10 ::= SEQUENCE {
    ca-BandwidthClassDL-r10          CA-BandwidthClass-r10,
    supportedMIMO-CapabilityDL-r10   MIMO-CapabilityDL-r10       OPTIONAL
}

CA-BandwidthClass-r10 ::= ENUMERATED {a, b, c, d, e, f, ...}

MIMO-CapabilityUL-r10 ::= ENUMERATED {twoLayers, fourLayers}

MIMO-CapabilityDL-r10 ::= ENUMERATED {twoLayers, fourLayers, eightLayers}
```

| Rel-8 Cat | 50M | 60M | 70MHz |
|---|---|---|---|
| 1 | Cat9 (DL 4layer: UL 1 layer)<br>Cat10(DL 4layer: UL 2 layer) | ... | ... |
| 2 | Cat11 (DL 4layer: UL 1 layer)<br>Cat12(DL 4layer: UL 2 layer) | ... | ... |
| 3 | Cat13 (DL 4layer: UL 1 layer)<br>Cat14(DL 4layer: UL 2 layer) | ... | ... |

USER APPARATUS, BASE STATION, USER APPARATUS CATEGORY INFORMATION NOTIFICATION METHOD, AND USER APPARATUS CATEGORY INFORMATION RECEPTION METHOD

TECHNICAL FIELD

The present invention relates to a technique in which a user apparatus UE in a mobile communication system of a scheme of LTE and the like notifies a base station eNB of capability information and category information of itself.

BACKGROUND ART

In the LTE (including LTE-Advanced) mobile communication system, UE categories on capabilities of user apparatuses UE are defined, in which requirements that should be supported are different for each category. For example, DL/UL peak throughput and the supported number of MIMO layers are defined for each UE category. As an example, FIG. 1 (non-patent document 1: 3GPP TS36.306) shows DL capabilities for each UE category.

Also, in LTE, it is defined that the user apparatus UE sends a UE category of itself by a predetermined message "UE-EUTRA-Capability" when it connects to a network, for example (non-patent document 2: TS36.331).

In release-8 of 3GPP (to be referred to as Rel-8, hereinafter), fields for notification of UE categories 1-5 are defined in the UE-EUTRA-Capability message. In release 10 (to be referred to as Rel-10, hereinafter), UE categories 6-8 are additionally defined, and fields for notification of them are defined. More particularly, as shown in the underlined parts in an information element (IE) of UE-EUTRA-Capability shown in FIG. 2, fields for notification of UE categories 1-5 and fields for notification of UE categories 6-8 are defined.

RELATED ART DOCUMENT

Non-Patent Document

Non-Patent Document 1: 3GPP TS 36.306 V10.9.0 (2013-03), 4.1 ue-Category
Non-Patent Document 2: 3GPP TS 36.331 V10.9.0 (2013-03), 6.3.6 Other information elements, UE-EUTRA-Capability

SUMMARY OF THE INVENTION

Problem to be Solved by the Invention

Current user apparatuses UE of up to UE category 7 support DL peak rates of up to 300 Mbps. In the future, it is considered that user apparatuses UE for realizing DL peak rates equal to or greater than 300 Mbps will appear. Therefore, UE categories up to 7 are not enough so that it is necessary to define additional UE categories. By the way, although UE category 8 can realize 3 Gbps, it is not a realistic UE category. That is, it is necessary to define UE categories of UE category 9 or greater for user apparatuses UE that realize DL peak rates equal to or greater than 300 Mbps.

On the other hand, as shown in the US-EUTRA-Capability message (ASN.1 structure) of FIG. 2, there is no spare in the fields for Rel-10. Thus, UE category 9 or greater cannot be defined.

Although it can be considered to add a field for a new UE category as a simple idea, there is a problem in that an overhead increases since the number of bits for signaling increases.

The present invention is contrived from the viewpoint of the above-mentioned points, and an object of the present invention is to provide a technique for notifying a base station of more category information without increasing overhead for notifying the base station of category information, such as UE category, of user apparatuses in a mobile communication system.

Means for Solving the Problem

For solving the problem, according to an embodiment of the present invention, there is provided a user apparatus in a mobile communication system including a base station and a user apparatus, including:

a support status determination unit configured to receive, from the base station, support status information indicating whether the base station supports a predetermine notification method on category information of the user apparatus, and to determine whether the base station supports the predetermined notification method based on the support status information; and a category information notification control unit configured, when the support status determination unit determines that the base station supports the predetermined notification method, to notify the base station of a combination of first category information and second category information so as to notify the base station of category information of the user apparatus.

According to an embodiment of the present invention, there is provided a base station in a mobile communication system including the base station and a user apparatus, including:

a support status information notification unit configured to notify the user apparatus of support status information indicating that the base station supports a predetermined notification method on category information of the user apparatus; and a category information determination unit configured to receive, from the user apparatus, a combination of first category information and second category information as category information of the user apparatus, and to determine predetermined category information corresponding to the first and the second category information to be category information of the user apparatus based on a predetermined correspondence relationship among the first and the second category information and the predetermined category information.

According to an embodiment of the present invention, there is provided a user apparatus in a mobile communication system including a base station and the user apparatus, including:

a storage unit configured to store category information of the user apparatus; and a category information notification control unit configured to transmit, as the category information, capability information of the user apparatus and other category information corresponding to a capability lower than the category information to the base station.

According to an embodiment of the present invention, there is provided a base station in a mobile communication system including the base station and a user apparatus, including:

a reception unit configured to receive, from the user apparatus, capability information of the user apparatus and first category information; and a category information determination unit configured to determine, as category information of the user apparatus, second category information corresponding to the capability information and the first category information based on a predetermined correspondence relationship among the capability information, the first category information, and the second category information corresponding to a capability higher than the first category information.

Effect of the Present Invention

According to an embodiment of the present invention, it becomes possible to notify a base station of more category information without increasing overhead for notifying the base station of category information, such as UE category, of user apparatuses in a mobile communication system.

BRIEF DESCRIPTION OF THE DRAWINGS

FIG. 1 is a diagram for showing definitions of UE categories;

FIG. 2 is a diagram for showing a part of UE-EUTRA-Capability information element;

FIG. 5 is a diagram showing a content example of a SIB when transmitting information indicating support by using broadcast information;

FIG. 6 is a diagram showing a content example of a SIB when transmitting release information by using broadcast information;

FIG. 7 is a diagram showing a content example of a message when transmitting information indicating support by using an individual signal;

FIG. 8 is a diagram showing a content example of a message when transmitting release information by using an individual signal;

FIG. 9 is a diagram showing an example of a combining method of a value of UE category field of Rel-8 and a value of UE category field of Rel-10;

FIG. 14 is a diagram showing a correspondence relationship among capability information (CA capability) of the user apparatus UE, UE category, and a value of Rel-8 UE category field in a second embodiment;

FIG. 15 is a diagram showing an example of a capability information notification message including information of the number of MIMO layers;

FIG. 16 is a diagram showing a correspondence relationship among capability information (CA capability, the number of MIMO layers) of the user apparatus UE, UE category, and a value of Rel-8 UE category field in the second embodiment;

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below. For example, although content on UE category (category information) in particular releases of 3GPP technical specification (LTE) is described as an example, the present invention is not limited to this. For example, the present invention can be applied to mobile communication systems, other than LTE, for notifying a base station of category information or capability information of user apparatuses.

(Outline)

In the present embodiment, an UE category of UE category 9 or greater is notified without adding a new UE category field in a message (more particularly, UE-EUTRA-Capability, to be referred to as capability information notification message, hereinafter) for notifying the base station eNB of capability information of the user apparatus UE. More particularly, there are a first embodiment and a second embodiment.

In the first embodiment, the base station eNB notifies the user apparatus UE of support status and release information, and the user apparatus notifies the base station eNB of category information of UE category 9 or greater by combining UE category information of Rel-8 and UE category information of Rel-10.

In the second embodiment, a UE category of UE category 9 or greater is notified by binding with other information (example: CA band combination, the number of MIMO) corresponding to a capability of the user apparatus UE. In the following, each embodiment is described.

First Embodiment

Process Content and the Like

Figure 3:
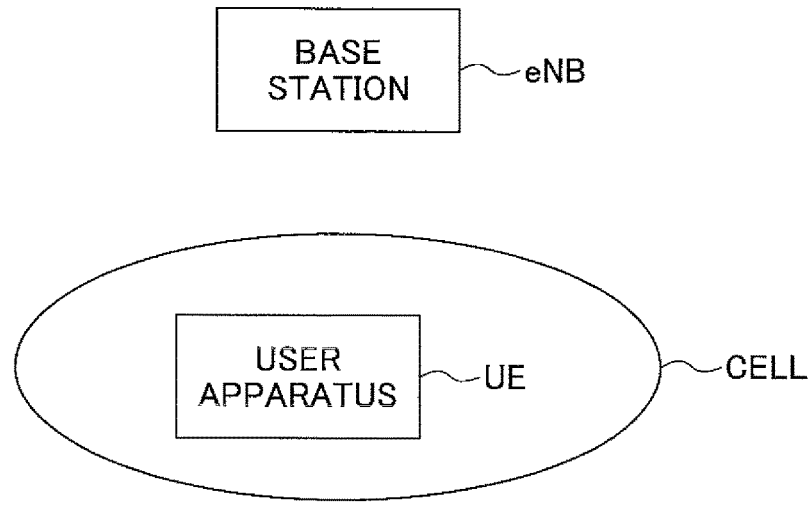
FIG. 3 is a block diagram of a communication system of an embodiment of the present invention.

FIG. 3 shows a block diagram of a communication system of an embodiment (common to the first and the second embodiments) of the present invention. The communication system of the present embodiment is a communication system of the LTE scheme, and as shown in FIG. 3, the communication system includes a user apparatus UE and a base station eNB.

Figure 4:
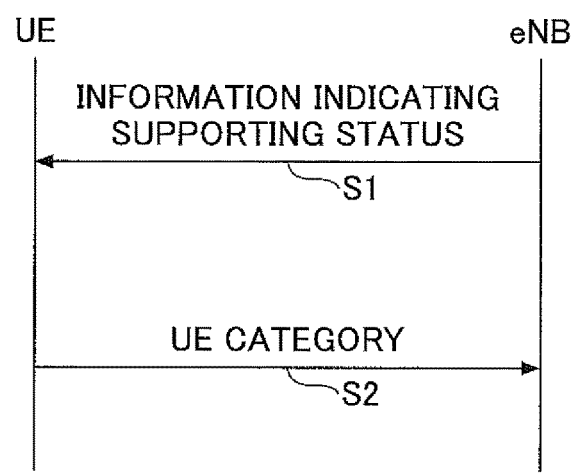
FIG. 4 is a diagram showing a process procedure between a base station eNB and a user apparatus UE in the present embodiment.

FIG. 4 is a diagram showing an outline of a process procedure in the present embodiment. As shown in FIG. 4, before the user apparatus UE notifies the base station eNB of a UE category, first, the base station eNB notifies the user apparatus UE of information indicating support status for a notification method of a UE category of UE category 9 or greater in the present embodiment (one bit information indicating "supported/not-supported", release information and the like) (step 1). Then, the user apparatus UE determines a notification method depending on whether the base station eNB supports a notification method of UE category 9 or greater, and notifies of a UE category by the notification method (step 2).

Although the method for the base station eNB to notify the user apparatus UE of the information indicating support status is not limited to a particular method, it is possible, for example, to perform notification by using broadcast information (system information), or an individual signal such as UECapabilityEnquiry and the like. Also, as to the information to be notified, release information may be notified as mentioned above, or information indicating that the base station eNB supports the notification method of UE category descried in the present embodiment may be notified.

FIG. 5 shows a concrete content example of a SIB (SystemInformationBlockType2 information element) when notifying of the information indicating support by broadcast information. Underlined parts in FIG. 5 correspond to the notification. FIG. 6 shows a concrete content example of a SIB (SystemInformationBlockType2 information element) when notifying of release information of the base station eNB by broadcast information. Underlined parts in FIG. 6 correspond to the notification.

FIG. 7 shows a concrete content example of a message (UECapabilityEnquiry message) when notifying of information indicating support by using an individual signal. Underlined parts in FIG. 7 correspond to the notification. FIG. 8 shows a concrete content example of a message (UECapabilityEnquiry message) when notifying of release information of the base station eNB by using an individual signal. Underlined parts in FIG. 8 correspond to the notification. In the present embodiment, it is assumed that a particular release or greater (example: Rel-11 or greater) supports the notification method of UE category 9 or greater of the present embodiment. Therefore, the user apparatus UE can ascertain whether the base station eNB supports the notification method of UE category 9 or greater based on the release information of the base station eNB.

For example, notification of the information indicating support can be performed by 1 bit. Thus, according to the present embodiment, only by adding 1 bit of a signal from the base station eNB, it becomes possible that the user apparatus UE notifies of UE category information of up to UE category 20 as described later.

In a case where the user apparatus UE that has received information indicating support status from the base station eNB in step 1 of FIG. 4 detects that the base station eNB supports UE category 9 or greater, the user apparatus UE notifies the base station eNB of a UE category of up to 20 at the maximum by combining a value of a UE category field of Rel-8 and a value of a UE category field of Rel-10.

FIG. 9 shows an example of a combining method. Values of 1-5 in the left side of FIG. 9 are values to be notified by using the UE category field of Rel-8, and values of 6-8 in the upper side are values to be notified by using the UE category field of Rel-10.

As shown in FIG. 9, for example, in a case where the user apparatus UE notifies of UE category 9, the user apparatus UE notifies the base station eNB of a capability information notification message (UE-EUTRA-Capability) in which the value of the UE category field of Rel-8 is set to be 1, and the value of the UE category field of Rel-10 is set to be 6.

In Rel-10, it is defined that, when the user apparatus UE notifies of UE category 6, the user apparatus notifies of UE category 4 at the same time, and when the user apparatus UE notifies of UE category 7, the user apparatus UE notifies of UE category 4 at the same time, and when the user apparatus UE notifies of UE category 8, the user apparatus UE notifies of UE category 5 at the same time. Thus, as shown in FIG. 9, combinations of these are not used for notification of UE category 9 or greater.

In Rel-10 which is a conventional technique, the user apparatus UE cannot know release information of the base station eNB before notifying the base station eNB of UE category of itself. Thus, for example, when the user apparatus UE notifies the base station eNB of UE category 7, the user apparatus UE uses the notification method such as of notifying of UE category 4 at the same time. In this case, when the base station eNB supports Rel-10, the base station eNB performs configuration assuming that the user apparatus UE is the UE category 7. But, when the base station eNB only supports up to Rel-8, the base station eNB performs configuration assuming that the UE category of the user apparatus UE is UE category 4. This is also applicable to UE categories 6 and 8.

The combinations shown in FIG. 9 are merely examples, and it can be arbitrarily determined which combination to be associated with which UE category.

Also, when the user apparatus UE detects that the base station eNB does not support UE category 9 or greater, the user apparatus UE notifies the base station eNB of a predetermined UE category by using a notification method for notification of a UE category up to UE category 8, for example.

<Apparatus Configuration, Process Flow>

Figure 10:
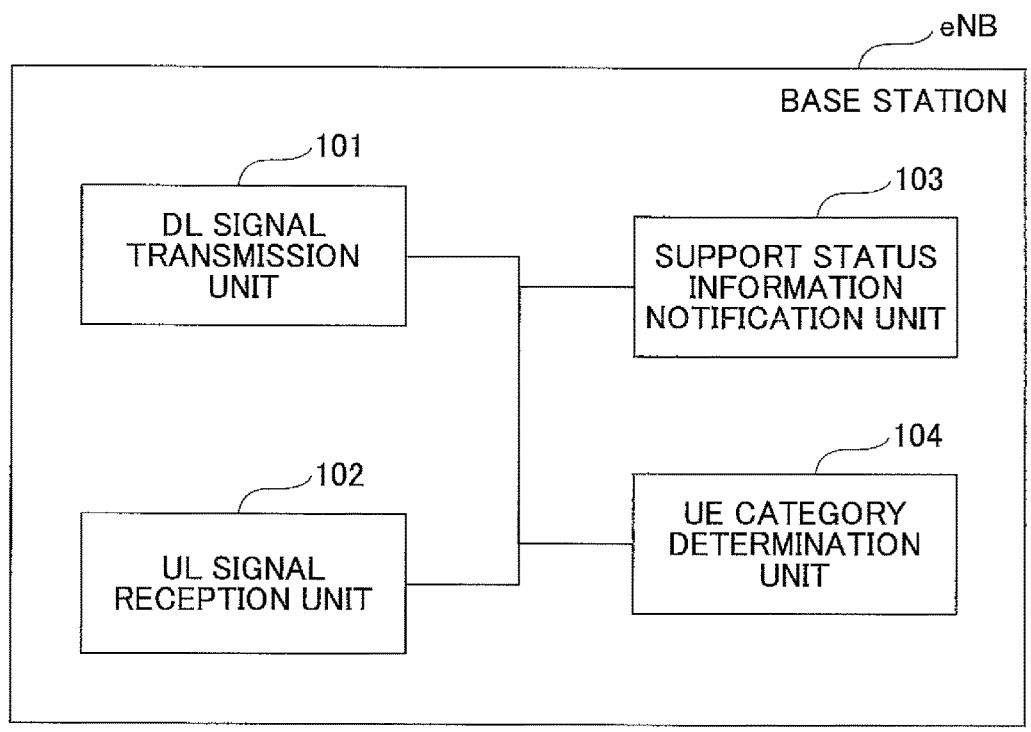
FIG. 10 is a functional block diagram of a base station eNB in a first embodiment.

FIG. 10 shows a functional block diagram of a base station eNB in the present embodiment. As shown in FIG. 10, the base station eNB includes a DL signal transmission unit 101, an UL signal reception unit 102, a support status information notification unit 103, and a UE category determination unit 104. FIG. 10 shows only functional units that are especially related to the embodiment of the present invention, and also includes at least functions, not shown in the figure, for performing operation complying with the LTE scheme. Also, the base station eNB shown in FIG. 10 supports the notification method of UE category in the present embodiment.

The DL signal transmission unit 101 includes a function for generating various signals of a physical layer from upper layer information to be transmitted from the base station eNB, and transmitting the various signals to the user apparatus UE. The UL signal reception unit 102 includes a function for receiving various uplink signals from the user apparatus UE and obtaining upper layer information from the received signal of the physical layer.

The support status information notification unit 103 includes a function for notifying, via the DL signal transmission unit 101, the user apparatus UE of information (information indicating support status) indicating whether the base station eNB supports the notification method of UE category in the present embodiment.

The UE category determination unit 104 includes a storage unit storing a table, as shown in FIG. 9, indicating correspondence relationship between a value of Rel-8 UE category field, a value of Rel-10 UE category field, and UE category of 9 or greater, and determines a UE category of the user apparatus UE based on one or more values of UE category fields that are included in a capability information notification message received from the user apparatus UE by referring to the table.

Figure 11:
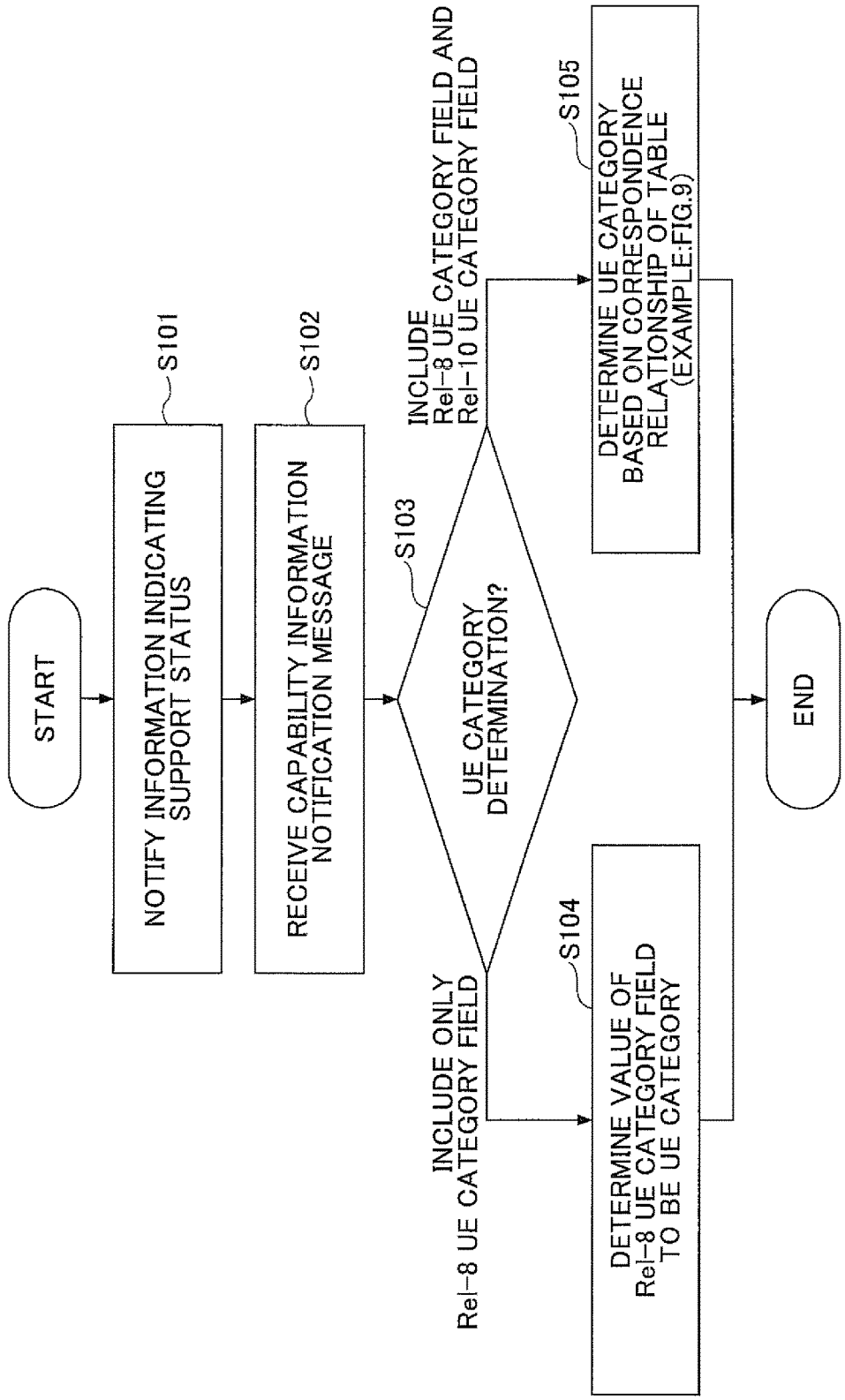
FIG. 11 is a flowchart showing an operation example of the base station eNB in the first embodiment.

An operation example of the base station eNB is described with reference to a flowchart of FIG. 11. First, the support status information notification unit 103 of the base station eNB notifies the user apparatus UE of information indicating a support status (step 101). After that, the UE category determination unit 104 of the base station eNB receives, from the user apparatus UE, a capability information notification message via the UL signal transmission unit 102 (step 102), and determines a UE category of the user apparatus UE based on content of the capability information notification message and the like (step 103).

When the capability information notification message includes only a Rel-8 UE category field in a Rel-10 UE category field and a Rel-8 UE category field, the UE category determination unit 104 determines that the UE category of the user apparatus UE is a value of the Rel-8 UE category field (step 104).

When the capability information notification message includes both of the Rel-8 UE category field and the Rel-10 UE category field, the UE category determination unit 104 determines the UE category of the user apparatus UE according to the holding table shown in FIG. 9 (step 105). For example, when the value of Rel-10 UE category field is 7, and the value of Rel-8 UE category field is 2, the UE category determination unit 104 determines the UE category of the user apparatus UE to be 13. Also, for example, when the value of Rel-10 UE category field is 7, and the value of Rel-8 UE category field is 4, the UE category determination unit 104 determines the UE category of the user apparatus UE to be 7. After that, the base station eNB performs configuration corresponding to the determined UE category so as to be able to perform communication with the user apparatus UE by a communication scheme corresponding to the user apparatus UE of the UE category.

Transmission of information indicating a support status from the base station eNB to the user apparatus UE, and transmission of a UE category from the user apparatus UE to the base station eNB may be performed by a predetermined trigger such as start of connection and the like, or may be performed periodically.

Figure 12:
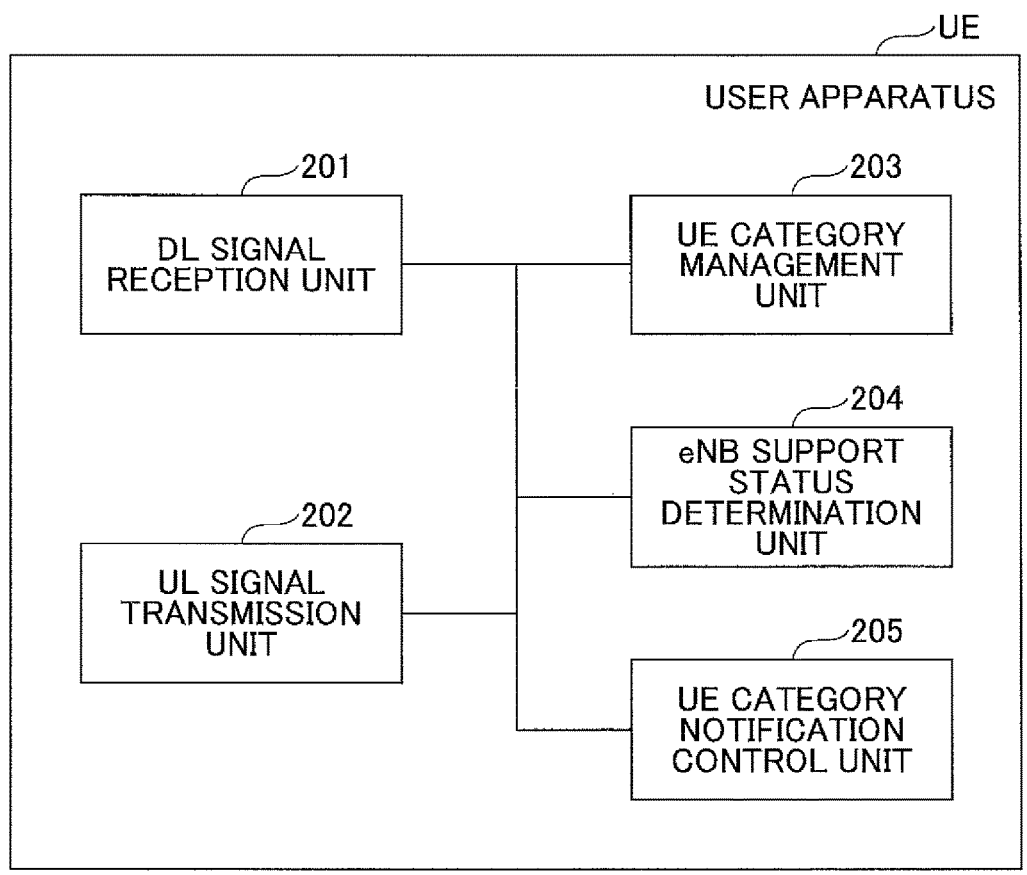
FIG. 12 is a functional block diagram of a user apparatus UE in the first embodiment.

FIG. 12 shows a functional block diagram of the user apparatus UE in the present embodiment. As shown in FIG. 12, the user apparatus UE includes a DL signal reception unit 201, an UL signal transmission unit 202, a UE category management unit 203, an eNB support status determination unit 204, and a UE category notification control unit 205. It is assumed that the user apparatus UE is UE category 9 or greater. FIG. 12 shows only functional units that are especially related to the present invention, and also includes at least functions, not shown in the figure, for performing operation complying with the LTE scheme.

The DL signal reception unit 201 includes a function for receiving various downlink signals from the base station eNB and obtaining upper layer information from the received signal of the physical layer. The UL signal transmission unit 202 includes a function for generating various signals of a physical layer from upper layer information to be transmitted from the user apparatus UE, and transmits the various signals to the base station eNB.

UE category management unit 203 includes a storage unit for storing a UE category (example: UE category 10) of the user apparatus UE itself, and has a function for receiving an inquiry from another functional unit and notifying the functional unit of the UE category. Also, the storage unit may store values of combinations (Rel-8 UE category value and Rel-10 UE category value) based on relationship shown in FIG. 9 instead of or in addition to the actual category such as UE category 10.

The eNB support status determination unit 204 includes a function for determining whether the base station eNB supports the notification method of UE category of the present embodiment based on information (example: FIG. 5-FIG. 8) indicating a support status received from the base station eNB. The UE category notification control unit 205 obtains a UE category of itself from the UE category management unit 203, and, based on a determination result by the eNB support status determination unit 204, the UE category notification control unit 205 notifies the base station eNB of the UE category by a combination of two values as shown in FIG. 9, or notifies the base station eNB of a predetermined UE category. The UE category notification control unit 205 may have a table of the correspondence relationship shown in FIG. 9 to determine the combination of the two values based on the table and an actual UE category, or the UE category notification control unit 205 may hold the combination of the two values beforehand to use the values. The present example assumes the latter case.

Figure 13:
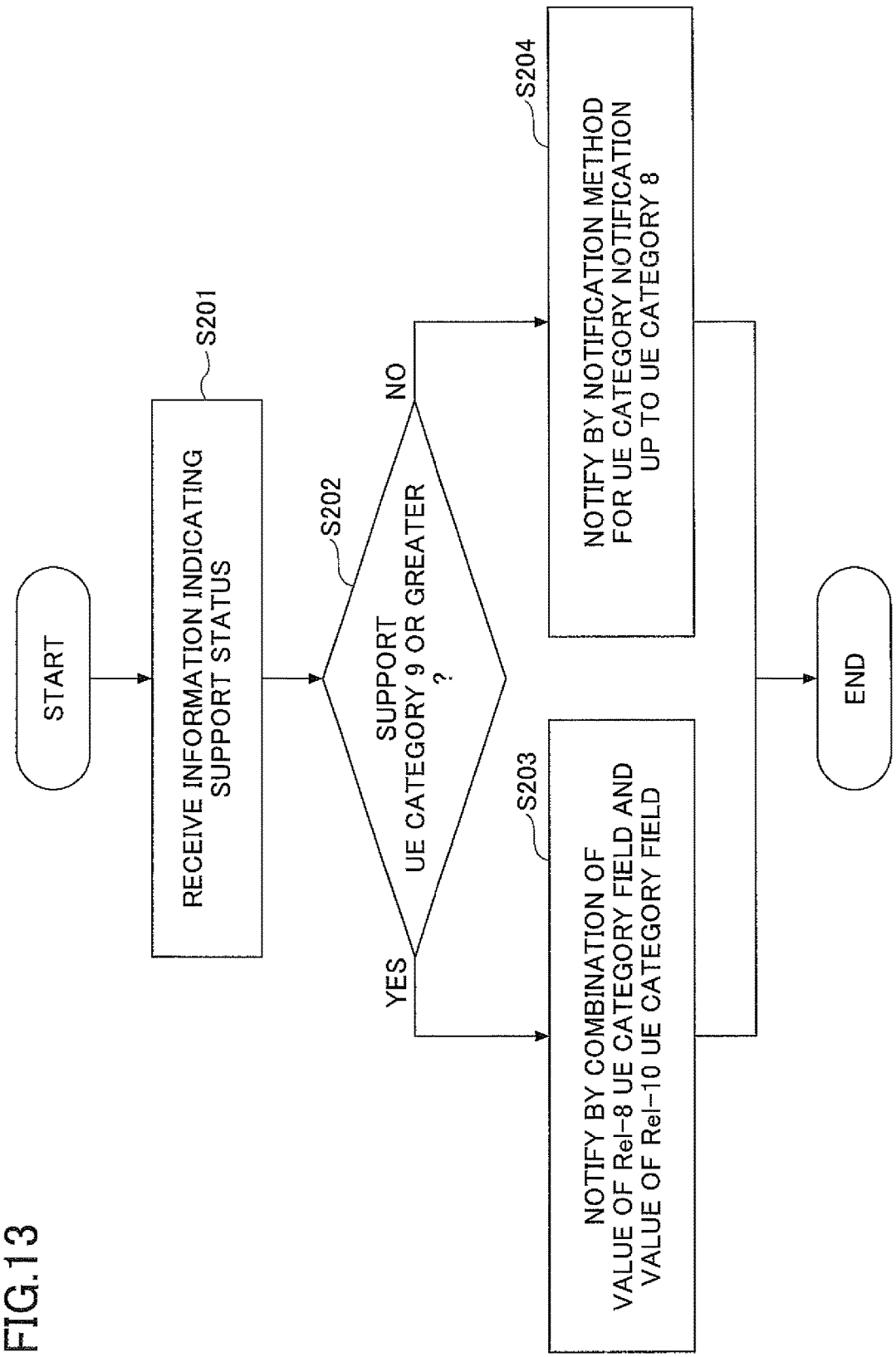
FIG. 13 is a flowchart showing an operation example of the user apparatus UE in the first embodiment.

An operation example of the user apparatus UE is described with reference to a flowchart shown in FIG. 13. When the eNB support status determination unit 204 of the user apparatus UE receives, from the base station eNB, information indicating a support status via the DL signal reception unit 201 (step 201), the eNB support status determination unit 204 determines, based on the information, whether the base station eNB supports a UE category notification method of UE category 9 or greater in the present embodiment (step 202).

In step 202, when it is determined that the base station eNB supports the UE category notification method of UE category 9 or greater, the UE category notification control unit 205 obtains, from the storage unit, a value of Rel-8 UE category field and a value of Rel-10 UE category field corresponding to a UE category of itself, and notifies the base station eNB of a capability information notification message including the combination of these values via the UL signal transmission unit 202 (step 203). For example, in a case where the user apparatus UE corresponds to UE category 9, the UE category notification control unit 205 notifies the base station eNB of a capability information notification message in which the value of Rel-8 UE category field is set to be 1 and the value of Rel-10 UE category field is set to be 6.

In step 202, when it is determined that the base station eNB does not support UE category 9 or greater, the UE category notification control unit 205 notifies of a predetermined UE category by a notification method for notification of UE categories up to UE category 8 (step 204).

As mentioned above, according to the present embodiment, there is provided a user apparatus in a mobile communication system including a base station and a user apparatus, including:

a support status determination unit (example: eNB support status determination unit 204) configured to receive, from the base station, support status information indicating whether the base station supports a predetermine notification method on category information of the user apparatus, and to determine whether the base station supports the predetermined notification method based on the support status information; and a category information notification control unit (example: UE category information notification control unit 205) configured, when the support status determination unit determines that the base station supports the predetermined notification method, to notify the base station of a combination of first category information and second category information so as to notify the base station of category information of the user apparatus.

For example, the mobile communication system is a mobile communication system of an LTE scheme, and the category information notification control unit notifies the base station of a UE category of UE category 9 or greater, as the category information of the user apparatus, by a capability information notification message including the combination of the first category information and the second category information.

According to the above configuration, for example, a UE category of UE category 9 or greater can be notified without increasing a field for notifying the UE category of UE category 9 or greater, so that overhead can be reduced compared with a case where a field is increased.

For example, the first category information is a value of a UE category field of release 8, and the second category information is a value of a UE category field of release 10. However, when existing other field can be used by replacement, the other field may be used.

Also, according to the present embodiment, there is provided a base station in a mobile communication system including the base station and a user apparatus, including:

a support status information notification unit configured to notify the user apparatus of support status information indicating that the base station supports a predetermined notification method on category information of the user apparatus; and a category information determination unit configured to receive, from the user apparatus, a combination of first category information and second category information as category information of the user apparatus, and to determine predetermined category information corresponding to the first and the second category information to be category information of the user apparatus based on a predetermined correspondence relationship among the first and the second category information and the predetermined category information.

Second Embodiment

Next, a second embodiment is described.
<Process Content>

In the present embodiment, the user apparatus UE notifies the base station UE of capability information, other than UE category, of the user apparatus and a UE category by binding them.

In the present embodiment, as an example of the capability information, supporting carrier aggregation (CA) capability information and MIMO capability information are explained. The capability information is not limited to these, and capability information other than these may be used.

In the present embodiment, a user apparatus UE of UE category 9 or greater, that is, a user apparatus UE supporting a combination of CA/MIMO exceeding 300 Mbps notifies the base station eNB of capability information of the CA/MIMO, and notifies the base station eNB of a UE category of itself by using a Rel-8 UE category field. Then, the base station eNB replaces the value of the Rel-8 UE category field according to a predetermined rule (association table and the like). Instead of using a table like this, the base station eNB may estimate a realizable peak rate (downlink maximum rate) based on the capability information such as CA/MIMO so as to estimate the UE category based on the peak rate. In this case, for example, a table indicating correspondence relationship among peak rate, the value of Rel-8 UE category field, and UE category is used.

The CA capability information is described more concretely. The CA capability information indicates a maximum bandwidth that can be realized by CA, and is information of CA band combination notified by a capability information notification message in the present embodiment. For example, CA_XC-YA that is an example of CA band combination means a band of 40 M+20 M=60 MHz.

Then, as shown in FIG. 14, correspondence relationship among CA capability information, a value of Rel-8 UE category field, and UE category of UE category 9 or greater is predetermined as a table. Based on the correspondence relationship, the user apparatus UE performs notification of a UE category by setting, in the capability information notification message, actual CA capability information (example: CA band combination=CA_XC-YA) and a value of Rel-8 UE category field. By the way, it is not necessary that the user apparatus UE has the table shown in FIG. 14. It is only necessary that the user apparatus UE holds a value of Rel-8 UE category field that should be reported according to the relationship shown in FIG. 14. Of course, the user apparatus UE may have the table shown in FIG. 14 so as to determine the value of the Rel-8 UE category field from the actual UE category by referring to the table.

Also, the user apparatus UE may transmit a capability information notification message including both of the CA capability information and the value of the Rel-8 UE category field, or may transmit them using separate capability information notification messages.

For example, in a case where the relationship shown in FIG. 14 is defined, when the UE category of the user apparatus UE is 10 and CA capability information is 50 MHz, the user apparatus UE transmits, to the base station eNB, a capability information notification message including the above-mentioned CA capability information by setting the value of Rel-8 UE category defiled to be 2.

The base station eNB holds the table shown in FIG. 14, so as to determine the UE category of the user apparatus UE from the table based on the CA capability information and the value of the Rel-8 UE category field received from the user apparatus UE. For example, as mentioned above, when the base station eNB receives, from the user apparatus UE, information indicating 50 MHz as CA capability information, and receives 2 as a value of Rel-8 UE category field, the base station eNB determines that the UE category of the user apparatus UE is 10 by referring to the table shown in FIG. 14.

In addition to CA capability information, the number of MIMO layers may be considered. In Rel-10, the number of layers of MIMO for each of DL and UL is reported as a capability for each band included in CA capability information (Band combination) (refer to underlined part of FIG. 15), and this can be further considered.

That is, correspondence relationship among CA capability information, the number of MIMO layers, a value of Rel-8 UE category field, and UE category of the user apparatus UE is predefined, and according to this correspondence relationship, the user apparatus UE notifies the base station eNB of a capability information notification message in which a value of Rel-8 UE category field corresponding to the UE category of the user apparatus UE, CA capability information and the number of MIMO layers is set. As described before, it is not necessary that the user apparatus UE has the table shown in FIG. 16. It is only necessary that the user apparatus UE holds a value of Rel-8 UE category field to be notified according to the relationship shown in FIG. 16. Of course, the user apparatus UE may include the table shown in FIG. 16 so as to determine the value of Rel-8 UE category field based on an actual UE category by referring to the table.

Also, the user apparatus UE may transmit a capability information notification message including both of CA capability information and the number of MIMO layers, and the value of Rel-8 UE category field, or may transmit them by separate capability information notification messages.

For example, in the example of FIG. 16, when the UE category of the user apparatus UE is 11, CA capability information is 50 MHz, and the number of MIMO layers is 4 layers for DL and 1 layer for UL, the user apparatus UE transmits, to the base station eNB, a capability information notification message that includes the CA capability information, the number of MIMO layers, and 2 as the value of Rel-8 UE category field.

The base station eNB holds the table shown in FIG. 16, and determines UE category of the user apparatus UE from the table based on the CA capability information, the number of MIMO layers and the value of Rel-8 UE category field that are received from the user apparatus UE. For example, as mentioned above, when the base station eNB receives, from the user apparatus UE, information indicating 50 MHz as CA capability information, receives 4 layers for DL and 1 layer for UL as the number of MIMO layers, and receives 2 as a value of Rel-8 UE category field, the base station eNB determines that the UE category of the user apparatus UE is 11 by referring to the table shown in FIG. 16.

<Apparatus Configuration, Process Flow>

Figure 17:
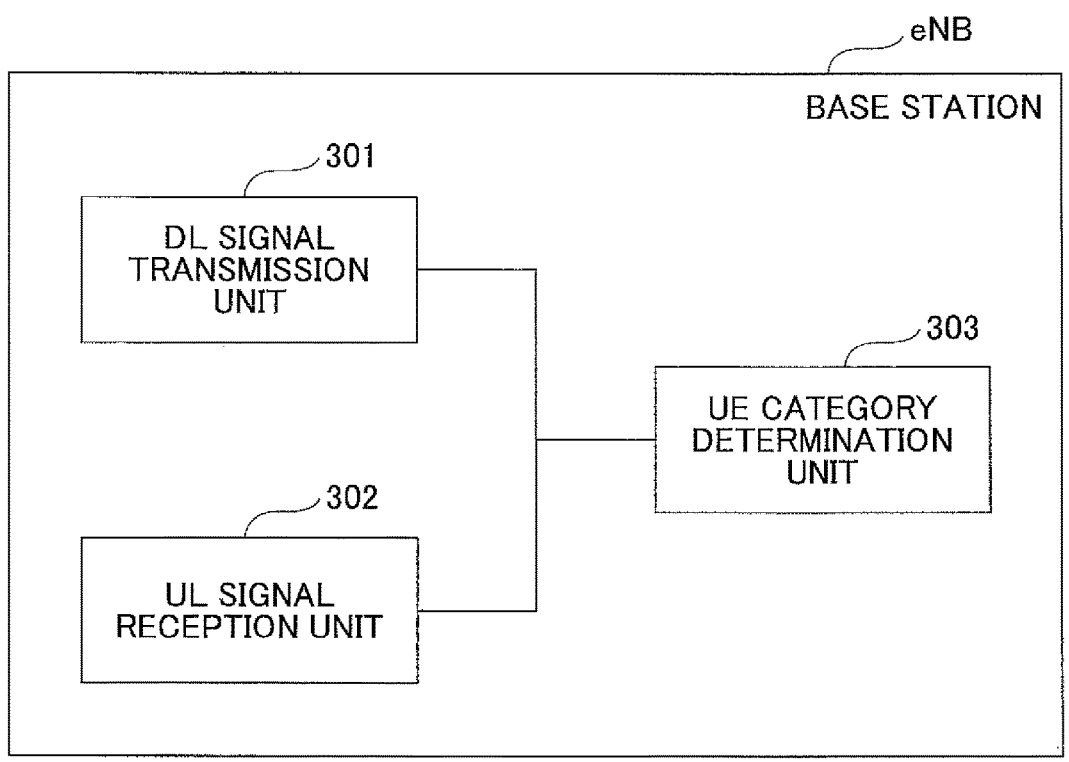
FIG. 17 is a functional block diagram of a base station eNB in the second embodiment.

FIG. 17 shows a functional block diagram of a base station eNB in the present embodiment. As shown in FIG. 17, the base station eNB includes a DL signal transmission unit 301, an UL signal reception unit 302, and a UE category determination unit 303. FIG. 17 shows only functional units that are especially related to the embodiment of the present invention, and also includes at least functions, not shown in the figure, for performing operation complying with the LTE scheme.

The DL signal transmission unit 301 includes a function for generating various signals of a physical layer from upper layer information to be transmitted from the base station eNB, and transmitting the various signals to the user apparatus UE. The UL signal reception unit 302 includes a function for receiving various uplink signals from the user apparatus UE and obtaining upper layer information from the received signal of the physical layer.

The UE category determination unit 303 includes a storage unit for storing a table shown in FIG. 14, FIG. 16 or the like, for example, and determines a UE category of the user apparatus UE based on capability information included in the capability information notification message received from the user apparatus UE, and the value of Rel-8 UE category field by referring to the table.

Figure 18:
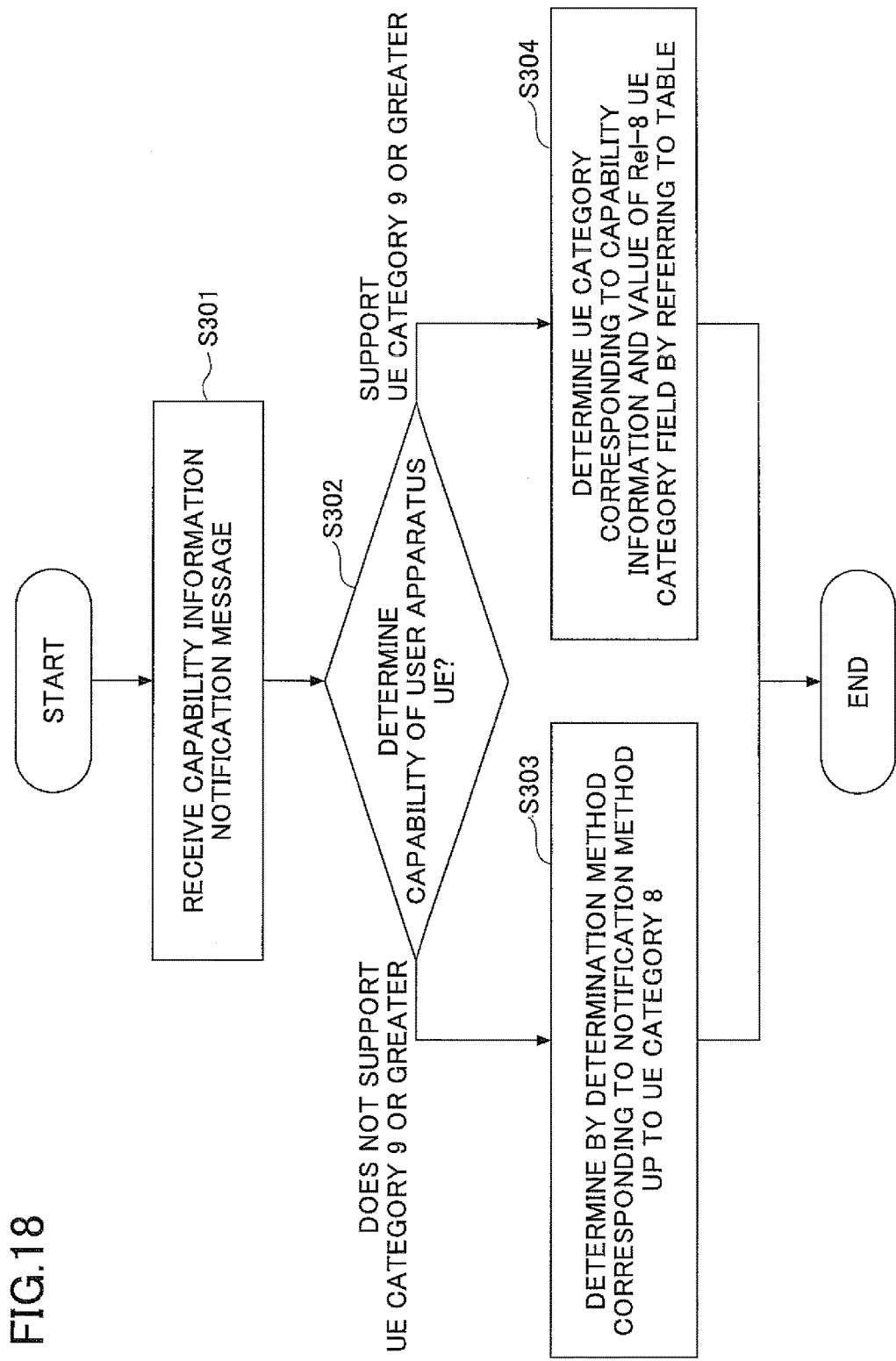
FIG. 18 is a flowchart showing an operation example of the base station eNB in the second embodiment.

An operation example of the base station eNB is described with reference to the flowchart of FIG. 18. The UE category determination unit 303 of the base station eNB receives a capability information notification message from the user apparatus UE (step 301), and determines the capability of the user apparatus UE based on the content of the capability information notification message as follows (step 302).

When CA capability information included in the capability information notification message corresponds to UE category 9 or greater (for example, when CA capability information is information indicating equal to or greater than 50 MHz), the UE category determination unit 303 refers to the table by using the capability information and the value of the Rel-8 UE category field included in the capability information notification message so as to determine a UE category corresponding to the capability information and the value of the Rel-8 UE category field (step 303).

When the CA capability information included in the capability information notification message does not correspond to UE category 9 or greater (for example, when the CA capability information is information indicating a value less than 50 MHz), the UE category determination unit 303 determines the UE category by a determination method corresponding to a notification method up to UE category 8 (step 304). That is, for example, when the value of the Rel-8 UE category field is 3, the UE category determination unit 303 determines that the UE category is 3.

After that, the base station eNB performs configuration corresponding to the determined UE category so as to be able to perform communication with the user apparatus UE by a communication scheme corresponding to the user apparatus UE of the UE category.

Figure 19:
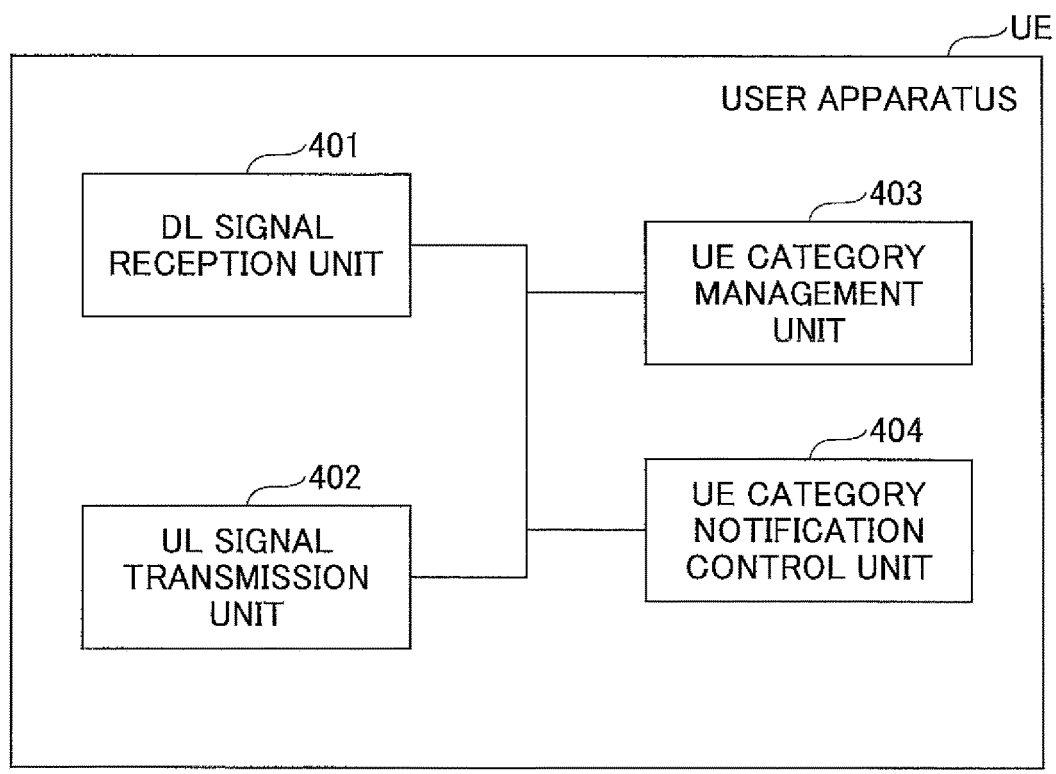
FIG. 19 is a functional block diagram of a user apparatus UE in the second embodiment.

FIG. 19 shows a functional block diagram of a user apparatus UE in the present embodiment. As shown in FIG. 19, the user apparatus UE includes a DL signal reception unit 401, an UL signal transmission unit 402, a UE category management unit 403, and a UE category notification control unit 404. FIG. 19 shows only functional units that are especially related to the present invention, and also includes at least functions, not shown in the figure, for performing operation complying with the LTE scheme. Also, it is assumed that the user apparatus UE is UE category 9 or greater.

The DL signal reception unit 401 includes a function for receiving various downlink signals from the base station eNB and obtaining upper layer information from the received signal of the physical layer. The UL signal transmission unit 402 includes a function for generating various signals of a physical layer from upper layer information to be transmitted from the user apparatus UE, and transmitting the various signals to the base station eNB.

The UE category management unit 403 includes a storage unit for storing information of a UE category of the user apparatus UE itself, and has a function for receiving an inquiry from another functional unit and notifying the functional unit of the UE category. Also, the storage unit may store a value of Rel-8 UE category corresponding to the capability of the user apparatus UE shown in FIG. 14, FIG. 16 or the like instead of or in addition to the actual category such as UE category 10.

The UE category notification control unit 404 obtains a UE category of itself from the UE category management unit 403, and, based on the relationship shown in FIG. 14, FIG. 16 or the like, the UE category notification control unit 404 transmits, to the base station eNB, via the UL signal transmission unit 402, a capability information notification message in which capability information and a value of Rel-8 UE category field corresponding to the actual UE category of itself are set. The UE category notification control unit 404 may have a table shown in FIG. 14, FIG. 16 or the like so as to obtain UE category 9 or greater from the storage unit, and determine a value of Rel-8 UE category field based on the holding table, or the UE category notification control unit 404 may have the value of Rel-8 UE category field beforehand to use this value.

As mentioned above, according to the present embodiment, there is provided a user apparatus in a mobile communication system including a base station and the user apparatus, including:

a storage unit (example: UE category management unit 403) configured to store category information of the user apparatus; and a category information notification control unit (example: UE category notification control unit 404) configured to transmit, as the category information, capability information of the user apparatus and other category information corresponding to a capability lower than the category information to the base station.

For example, the mobile communication system is a mobile communication system of an LTE scheme, and the category information of the user apparatus is a UE category of UE category 9 or greater, and the other category information is a value of a UE category field of release 8. However, as the other category information, a field other than the UE category field of release 8 may be used.

According to the above configuration, a UE category of UE category 9 or greater can be notified without increasing a field for notifying the UE category of UE category 9 or greater, so that overhead can be reduced compared with a case where a field is increased.

Also, according to the present embodiment, there is provided a base station in a mobile communication system including the base station and a user apparatus, including:

a reception unit (example: UL signal reception unit 302) configured to receive, from the user apparatus, capability information of the user apparatus and first category information; and a category information determination unit (example: UE category determination unit 303) configured to determine, as category information of the user apparatus, second category information corresponding to the capability information and the first category information based on a predetermined correspondence relationship among the capability information, the first category information, and the second category information corresponding to a capability higher than the first category information.

For example, the mobile communication system is a mobile communication system of an LTE scheme, and the second category information is a UE category of UE category 9 or greater, and the first category information is a value of a UE category field of release 8. However, when existing other field can be used by replacement, the other field may be used.

In the above, the present invention has been explained while referring to the specific embodiments. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE and the base station eNB have been explained by using functional block diagrams. However, each apparatus may be implemented in hardware, software, or a combination thereof. The software that operates according to the present invention (software executed by a processor provided in the user apparatus UE, software executed by a processor provided in the base station eNB) may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international application claims priority based on Japanese patent application No. 2013-116426, filed in the JPO on May 31, 2013, and the entire contents of the Japanese patent application No. 2013-116426 are incorporated herein by reference.

DESCRIPTION OF REFERENCE SIGNS eNB base station
UE user apparatus
101 DL signal transmission unit
102 UL signal reception unit
103 support status information notification unit
104 UE category determination unit
201 DL signal reception unit
202 UL signal transmission unit
203 UE category management unit
204 eNB support status determination unit
205 UE category notification control unit
301 DL signal transmission unit
302 UL signal reception unit
303 UE category determination unit
401 DL signal reception unit
402 UL signal transmission unit
403 UE category management unit
404 UE category notification control unit

The invention claimed is:

1. A user apparatus in a mobile communication system including a base station and a user apparatus, comprising:
a support status determination unit configured to receive, from the base station, support status information indicating whether the base station supports a predetermined notification method on category information of the user apparatus, and to determine whether the base station supports the predetermined notification method based on the support status information; and
a category information notification control unit configured, when the support status determination unit determines that the base station supports the predetermined notification method, to notify the base station of a combination of first category information and second category information so as to notify the base station of category information of the user apparatus.

2. The user apparatus as claimed in claim 1, wherein the mobile communication system is a mobile communication system of an LTE scheme, and
the category information notification control unit notifies the base station of a UE category of UE category 9 or greater, as the category information of the user apparatus, by a capability information notification message including the combination of the first category information and the second category information.

3. The user apparatus as claimed in claim 2, wherein the first category information is a value of a UE category field of release 8, and the second category information is a value of a UE category field of release 10.

4. A base station in a mobile communication system including the base station and a user apparatus, comprising:

a support status information notification unit configured to notify the user apparatus of support status information indicating that the base station supports a predetermined notification method on category information of the user apparatus; and a category information determination unit configured to receive, from the user apparatus, a combination of first category information and second category information as category information of the user apparatus, and to determine predetermined category information corresponding to the first and the second category information to be category information of the user apparatus based on a predetermined correspondence relationship among the first and the second category information and the predetermined category information.

5. A user apparatus category information notification method executed by a user apparatus in a mobile communication system including a base station and the user apparatus, comprising:

a support status determination step of receiving, from the base station, support status information indicating whether the base station supports a predetermined notification method on category information of the user apparatus, and determining whether the base station supports the predetermined notification method based on the support status information; and a category information notification step of, when it is determined that the base station supports the predetermined notification method by the support status determination step, notifying the base station of a combination of first category information and second category information so as to notify the base station of category information of the user apparatus.

6. A user apparatus category information reception method executed by a base station in a mobile communication system including the base station and a user apparatus, comprising:

a support status information notification step of notifying the user apparatus of support status information indicating that the base station supports a predetermined notification method on category information of the user apparatus; and a category information determination step of receiving, from the user apparatus, a combination of first category information and second category information as category information of the user apparatus, and determining predetermined category information corresponding to the first and the second category information to be category information of the user apparatus based on a predetermined correspondence relationship among the first and the second category information and the predetermined category information.

* * * * *